Figure 1:
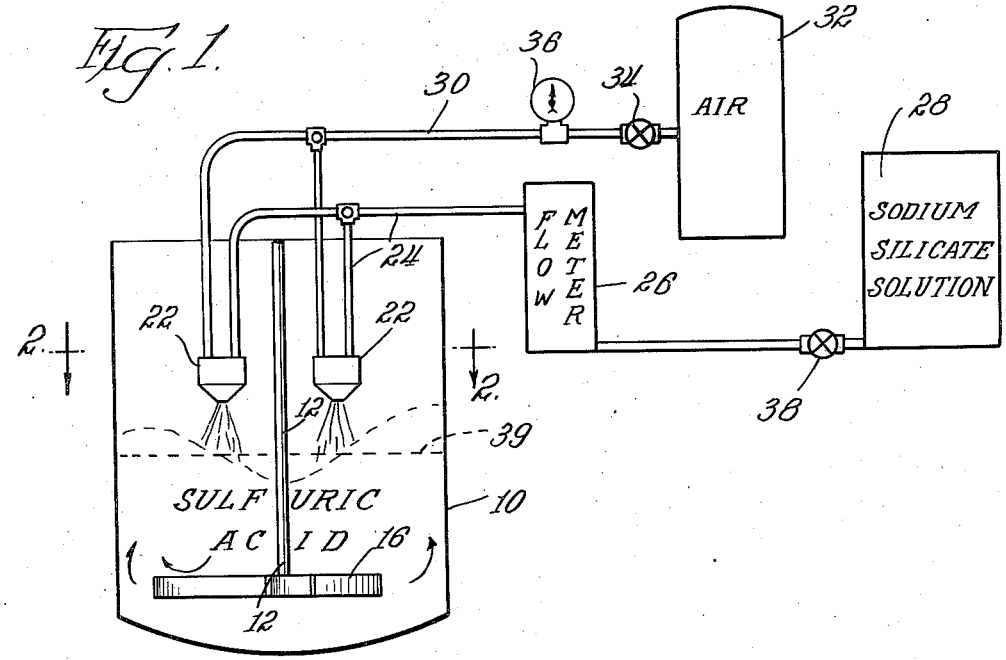
Figure 2:
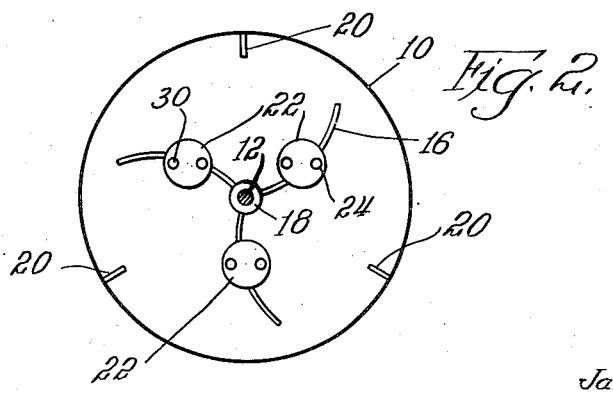

INVENTOR.
James Robert Archer
and Grover Dunn
BY
Soans, Pond & Anderson
Att'ys

Patented Oct. 4, 1949

2,483,868

UNITED STATES PATENT OFFICE 2,483,868

METHOD OF PREPARING SILICA GEL WHICH INVOLVES ATOMIZING SODIUM SILICATE INTO ACID

James Robert Archer, East Point, and Grover Dunn, Atlanta, Ga., assignors to International Minerals and Chemical Corporation, Chicago, Ill., a corporation of New York Application August 1, 1945, Serial No. 608,254

5 Claims. (Cl. 252—317)

This invention relates to the production of special forms of silica and is particularly applicable to the production of a substantially anhydrous lump product analyzing about 94% silica, which is sold in commerce as silica gel. It includes among its objects and advantages, the production of a more concentrated sol than was previously possible, with economy in production and improvement in the quality of the ultimate product. More specifically, the increased silica content in the sol involves reduced expense in the evaporation of water, and the final lump product has greater tensile strength and develops less fines during the processing.

In the accompanying drawing, Figure I is a diagrammatic side elevation of equipment for practicing the invention, and Figure II is a view looking downward as in section 1, line 22, of Figure I.

In the embodiment of apparatus selected for illustration, the tank or container 10 is provided with a turbo-type mixer indicated as having a shaft 12 and an impeller having three blades 16 radiating from the hub 18. To insure against the development of a rotary motion of the entire contents of the container, it is provided with three radial baffles 20.

There are also provided three spray heads 22 connected by liquid supply piping 24 through a flow meter 26 with a container 28 containing a supply of sodium silicate solution. The heads are also connected through piping 30 with a source of compressed air indicated at 32. The air supply may be controlled by the valve 34 and the effective pressure observed by means of the gauge 36, and the liquid supply may be controlled by the valve 38. Mechanical means (not shown) are provided for raising or lowering either the tank 10 or heads 22 to maintain any desired space or clearance between the surface of the charge of liquid in the tank and the sprayheads.

The operation is started with a charge of sulphuric acid solution in the tank 10, up to some such level as indicated at 39. The circulation is established by means of the mixer and then the solution is sprayed in the form of a fine mist or fog so that the individual globules of mist strike the liquid forcibly, and because the liquid is in turbulent motion, they are carried rapidly away from the point or area of impact and thoroughly disseminated throughout the body of the liquid with extreme rapidity.

It is desirable to start the operation with both the acid and the sodium silicate solution not warmer than 70° F., and preferably 60° F. or less. It is possible to add from ⅓ to ⅔ of the amount of silicate solution necessary to build up a batch of the product at a more rapid rate, thus reducing the mixing time so that an ample margin of safety remains and the liquids can be thoroughly mixed before the sol begins to gel. In this way we succeed in adding enough silicate to build up the desired silica concentration in less time than the mixed ingredients require to develop a condition such that turbulence will injure the product by rupturing an incipient gel orientation.

One successful illustrative operation according to the invention is as follows:

Example

The tank was charged with 180 pounds of sulfuric acid having a specific gravity of 1.2083 at 60° F., and an initial temperature of 66° F. To this was added 402.25 pounds of sodium silicate solution, having a specific gravity of 1.284 at 60° F., and an initial temperature of 60° F. This makes up a batch representing 86.64 pounds of silicon dioxide, with 19.51% of excess acid remaining in the batch. At the beginning, the atomized material was forced in at substantially 42 pounds per minute for about five minutes with an air pressure of 13.5 pounds gauge on the sprayheads. Then the rate of addition was reduced to 18.4 pounds per minute and at the end of about 11 minutes more the entire charge of sodium silicate had been added. During the mixing the temperature rose to 88° F. The batch was then transferred to another container and had set as a gel at the end of about 60 minutes. It was allowed to remain undisturbed for 18½ hours and washed with tap water. The washed gel was very clear and analyzed 21.25% silicon dioxide. After drying in an infra red dryer it was subjected to standard absorption tests and gave results in excess of standard specifications at relative humidities of 10%, 20%, 40%, 60%, 80%, and 100%.

Although one important advantage of the invention is the higher concentrations permissible, the procedure outlined is superior even when lower final concentrations are called for. The concentration of the acid may be as high as a specific gravity of 1.28, and the concentration of the silicate may be as high as a specific gravity of 1.33, but (unless starting temperatures are below room temperature) materially greater concentrations tend to result in a final temperature so high that the quality of the product is somewhat impaired.

By starting with initial temperatures as low as 40° F. it has been possible to increase the concentrations and produce a sol with as much as 17% silica, which gave a beautiful, clear transparent washed gel, apparently of as good or better quality than that produced when starting with higher temperatures.

Since removal of water from the washed product is a substantial element of cost, syneresis at any time prior to the final drying is a clear net gain. It has been found that syneresis during the setting and also even during washing increases rather rapidly with increased concentration of the gel.

Under usual conditions the gel finishes its set at the end of about 60 minutes and can be broken out at any time thereafter, but it does no harm to let it remain undisturbed for a matter of days, depending on convenience in the operation of the plant. To assist others in practicing the invention, specific amounts have been given based on sulfuric acid. However, any acid susceptible of double decomposition with sodium silicate and not objectionable as too corrosive or volatile, is also effective.

Without further elaboration, the foregoing will so fully explain the invention that others may readily adapt the same for use under various conditions of service.

We claim:

1. In the manufacture of silica gel by chemical interaction of silicate and acid in an acidic aqueous reaction mixture followed by washing and drying of the resultant gel, the improvement which consists in introducing sodium silicate solution in atomized form into a turbulently agitated sulfuric acid solution.

2. In the manufacture of silica gel from concentrated sols formed by chemical interaction of silicate and acid in an acidic aqueous reaction mixture followed by washing and drying of the resultant gel, the improvements comprising producing turbulent agitation in a body of sulfuric acid solution, and introducing atomized sodium silicate solution into said turbulent acid at an initial temperature of about 40° to about 70° F.

3. In the manufacture of silica gel from concentrated sols formed by chemical interaction of silicate and acid in an acidic aqueous reaction mixture followed by washing and drying of the resultant gel, the improvements comprising producing turbulent agitation in a body of sulfuric acid solution, and introducing atomized sodium silicate solution into said turbulent acid at an initial temperature of about 60° F., and before the gel has formed discontinuing agitation to permit the gel to form in an undisturbed state.

4. In the manufacture of silica gel by chemical interaction of silicate and acid in an acidic aqueous reaction mixture followed by washing and drying of the resultant gel, the improvements comprising producing by agitation turbulent motion in a body of sulfuric acid having a specific gravity of about 1.20 to about 1.28, and introducing atomized sodium silicate solution having a specific gravity of about 1.28 to about 1.33 into the turbulent acid body at an initial temperature not warmer than about 70° F.

5. In the manufacture of silica gel by chemical interaction of silicate and acid in an acidic aqueous reaction mixture followed by washing and drying of the resultant gel, the improvements comprising producing by agitation turbulent motion in a body of sulfuric acid having a specific gravity of about 1.20, introducing atomized sodium silicate solution having a specific gravity of about 1.28 into the turbulent acid body at an initial temperature of about 60° F., and at an initial rate of about 42 pounds of silicate per minute, and thereafter reducing the rate of addition to about 18 pounds per minute to prevent undesired excessive rise of temperature of said acid body, the particles of atomized silicate being introduced into said acid in sufficient quantity to form the gel product.

JAMES ROBERT ARCHER.
GROVER DUNN.

REFERENCES CITED

The following references are of record in the file of this patent:

UNITED STATES PATENTS

| Number | Name | Date |
|---|---|---|
| 1,674,558 | Miller | June 19, 1928 |
| 1,748,315 | Stoewener | Feb. 25, 1930 |
| 1,755,496 | Behrman | Apr. 22, 1930 |
| 1,756,625 | Behrman | Apr. 29, 1930 |
| 1,798,766 | Stoewener | Mar. 31, 1931 |
| 2,213,211 | Fleckenstein | Sept. 3, 1940 |
| 2,323,727 | Peterkin | Feb. 25, 1941 |
| 2,302,297 | Connolly | Nov. 17, 1942 |
| 2,356,128 | Thomas et al. | Aug. 22, 1944 |
| 2,370,200 | Shabaker | Feb. 27, 1945 |